United States Patent [19]

Ross

[11] Patent Number: 4,862,762
[45] Date of Patent: Sep. 5, 1989

[54] TOURING HANDLE BAR AND BRAKE ADAPTOR LEVER

[76] Inventor: John T. Ross, 2599 Inlake Crt, Mississauga, Ontario, Canada, L5N 2M9

[21] Appl. No.: 126,304

[22] Filed: Nov. 27, 1987

[30] Foreign Application Priority Data

May 3, 1987 [CA] Canada ................................. 533267

[51] Int. Cl.$^4$ ............................................. B62K 21/12
[52] U.S. Cl. ...................................... 74/551.1; 74/489
[58] Field of Search ................ 74/489, 551.1, 551.8, 74/551.9; D12/178; 280/289 H; 188/2 D, 24.11, 24.22

[56] References Cited

U.S. PATENT DOCUMENTS

| D. 25,065 | 1/1896 | Gendron | D12/178 |
| D. 208,448 | 8/1967 | Fritz | D12/178 |
| 3,915,028 | 10/1975 | Kine | 74/489 |
| 4,084,449 | 4/1978 | Kine | 74/489 |
| 4,503,729 | 3/1985 | Shimano | 74/551.1 |

FOREIGN PATENT DOCUMENTS

| 2535669 | 11/1982 | France | 74/551.1 |
| 256069 | of 1926 | United Kingdom | 188/2 D |

Primary Examiner—Gary L. Smith
Assistant Examiner—Flemming Saether

[57] ABSTRACT

A touring bicycle handlebar and reversible brake adaptor lever comprising of a handlebar having straight bar lengths extending equidistantly on each side of the handlebar boss providing the cyclist with the means to assume a hands on semicrouched posture, each straight bar length terminated by bent portions extending the bar upwardly above the level of the first straight portions to second straight portions with further bent portions extending the bar forwardly and downwardly, providing the cyclist with the means to assume a hands on upright posture, with third straight portions providing a means for mounting the brake lever assemblages, the third straight portions terminated by bending the bar backwardly to provide straight portions that extend beyond and below the first straight portions providing the cyclist the means to assume a hands on crouched posture and of a brake lever to replace the levers of the drop racing handlebar brake assemblages permitting the mounting of the modified assemblages on the touring handlebar so as to project toward the cyclist with the lever handle paralleling the straight bar length portions at the level of the handlebar boss where they can be grasped simultaneously for brake operation. The resultant positioning of the brake adaptor lever centrally in the assemblage mounting bracket minimizes the operational stress on the mechanism and permits the projection of the assemblage toward the cyclist reducing the required size of the lever to a minimum.

8 Claims, 3 Drawing Sheets

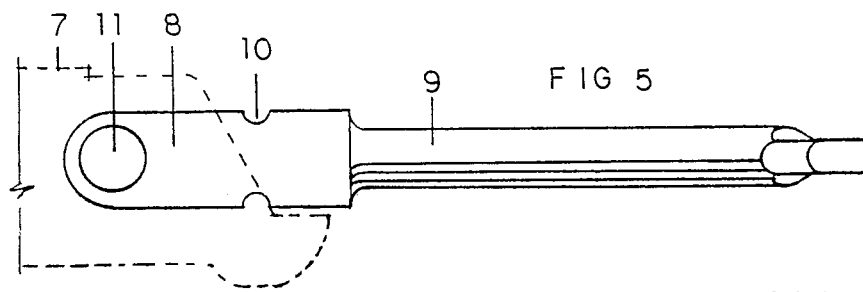
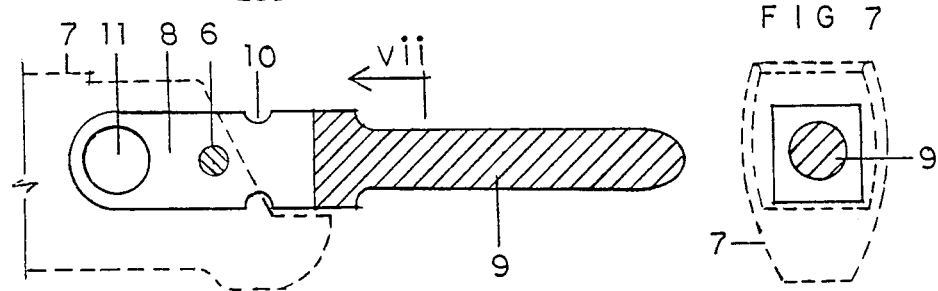
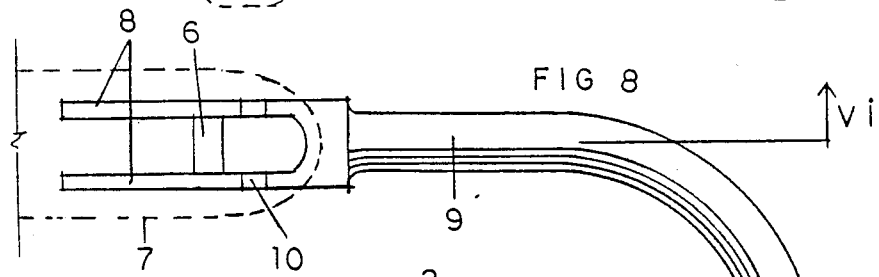
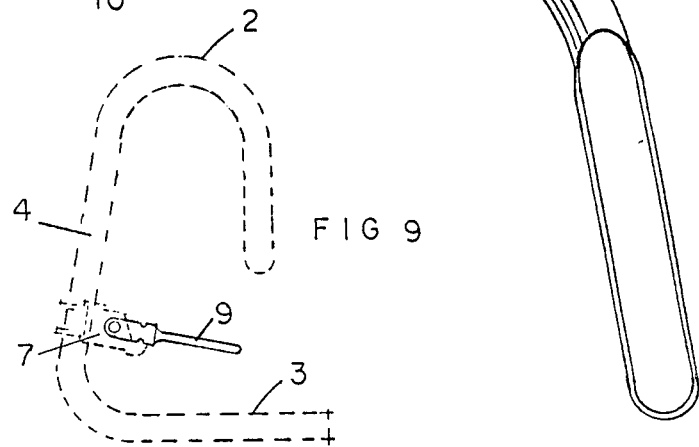
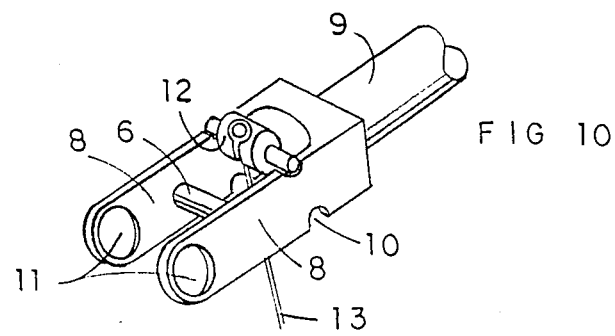

TOURING HANDLE BAR AND BRAKE ADAPTOR LEVER

FIELD OF INVENTION

The invention pertains to a handlebar and brake lever for mounting on the handlebar stem of a bicycle. More specifically it is a handlebar for installation on a touring bicycle, comprising of three distinct sets of hands on bar portions, the first set being at the level of the handlebar stem boss, the second set being appreciably above the level of the handlebar stem boss, the third set being appreciably below the level of the handlebar stem boss and a brake lever to replace the brake levers of the brake assemblages designed for installation on the drop racing handlebar to enable the modified brake assemblages to be mounted in an operable position on the touring handlebar.

BACKGROUND OF THE INVENTION

Generally a drop racing type handlebar is comprised of first straight lengths of bar extending equidistantly on each side of the handlebar boss, each straight length portion terminating at the first set of bent portions, in continuation with both straight length portions extending the bar forwardly thereof in a curved manner, with a second set of bent portions in continuation of the first bent portions and curving downwardly and rearwardly connecting to a second set of straight portions extending the bar back beyond the first straight portions.

The drop racing type handlebar is primarily designed to enable the cyclist to obtain maximum speed under varying degrees of wind resistance and difficulty of terrain with little or no extraneous baggage such as panniers, by assuming either a hands on crouched or semicrouched posture.

The brake assemblages designed for the drop racing type handlebar are provided with either a single vertical lever or a combination of a horizontal bent lever and vertical main lever for mounting on the outside forward curvature of the second bent portions of the drop racing handlebar with the assemblage projecting in a forward direction away from the cyclist. The horizontal bent auxiliary lever being operable with hands on the first set of straight portions and the main vertical lever to which the brake cable connection collar is attached being operable with the hands on the second set of straight portions.

SUMMARY OF THE INVENTION

The purpose of the invention is to provide a bicycle handlebar complete with a braking capability for long distant bicycle touring that will offer maximum opportunity for body positional change while riding the bicycle.

The drop racing handlebar that is currently installed on the touring bicycle was designed specifically for positioning the body to obtain maximum speed. The invention is a handlebar designed to obtain, in addition to speed, maximum comfort and control over long distances.

To obtain these additional attributes the touring handlebar has been designed to provide a set of handlebar portions at a level appreciably above the level of the handlebar boss to permit the cyclist to assume a hands on upright body posture. This capability minimizes the fatique of back, arm and hand muscles and problems physiotherapists associate with the restrictive postures a cyclist assumes with the drop racing handlebar and permits complete control of the bicycle while in the upright sitting posture.

Brake operating assemblages designed for installation on the racing handlebar when mounted on the touring handlebar are positionally inoperable. However by simply replacing the brake levers of the currently available assemblages with the brake adaptor lever these assemblages can be installed on the touring handlebar in an operable position.

BRIEF DESCRIPTION OF THE DRAWINGS

FIG. 5 is a side view of the Brake Adaptor Lever installed in the standard brake lever assemblage mounting bracket.

FIG. 6 is a section through the Brake Adaptor Lever on line "vi" of FIG. 8.

FIG. 7 is a cross section through the Brake Adaptor Lever on line "vii" of FIG. 6.

FIG. 8 is a top view of the Brake Adaptor Lever as installed in the standard brake lever assemblage mounting bracket.

FIG. 9 is a side view of the Touring Handle Bar and Brake Adaptor Lever combination.

FIG. 10 is a partial perspective view of the Brake Adaptor Lever with the standard cable connection collar in position.

DETAILED DESCRIPTION OF THE INVENTION

Figure 1:
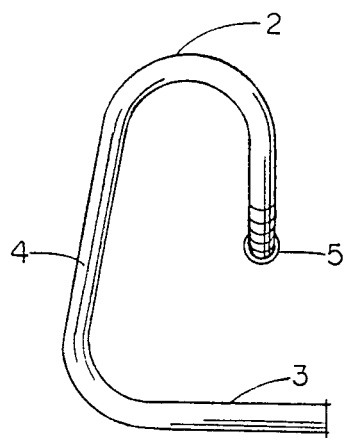
FIG. 1 is a side view of the Touring Handle Bar positioned as mounted on the bicycle.
Figure 2:
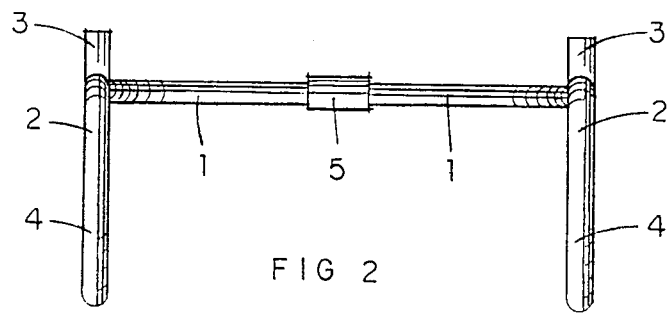
FIG. 2 is a top view of the Touring Handle Bar positioned as mounted on the bicycle.
Figure 3:
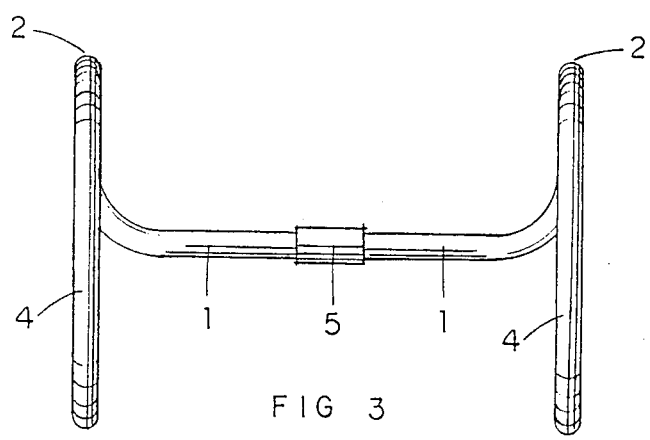
FIG. 3 is a front view of the Touring Handle Bar positioned as mounted on the bicycle.
Figure 4:
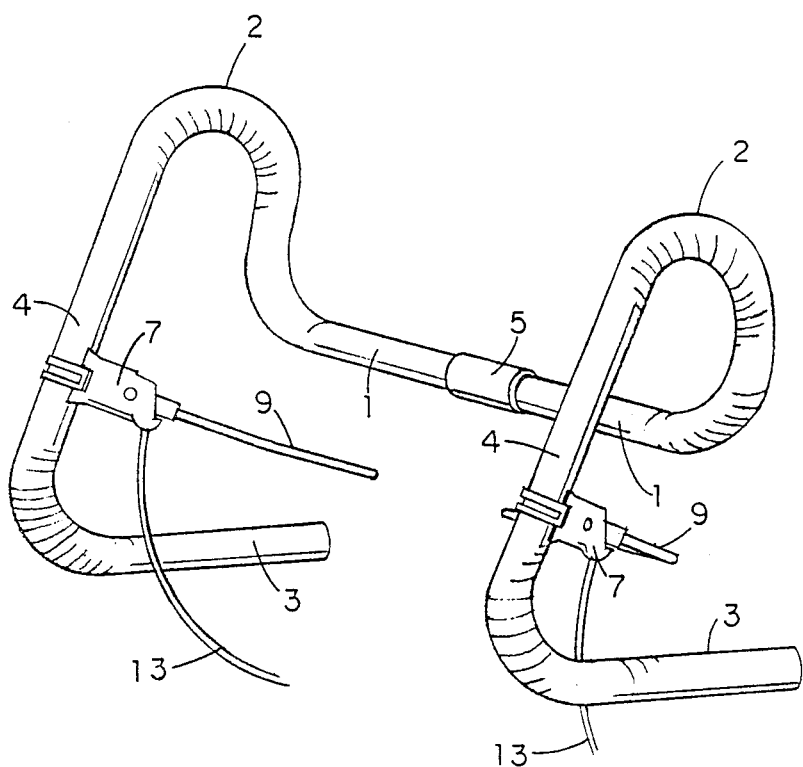
FIG. 4 is perspective view of the Touring Handle Bar complete with brake lever assemblages incorporating the Brake Adaptor Lever as mounted on the bicycle.

A handlebar of the invention for mounting on a handlebar stem of a touring bicycle is comprised of a boss (5) and a first straight length of bar (1) having portions extending equidistantly on each side of the boss, the first straight portions permitting the cyclist to assume a hands on semicrouched posture, each of the straight portions terminating at first bent portions, said first bent portions projecting the bar upwardly above the level of the boss to connect to second set of bent portions (2) for curving the bar forwardly and downwardly to third straight portions (4) providing mounting means for brake lever assemblages, the second bent portions permitting the cyclist to assume a hands on upright posture, said third straight portions terminating below said boss at third bent portions, the bar terminating in fourth straight portions (3) extending back beyond the first straight portions, said fourth straight portions permitting the cyclist to assume a hands on crouched posture.

The first bends of the handlebar are 90 degrees and extend in the vertical plane of the first straight portions and in a plane perpendicular to the top tube of the bicycle frame with the second bends being approximately 170 degrees and in a plane perpendicular to the first straight portions and the third bends being approximately 100 dgrees and in the same plane as the second bends.

All bends of the handlebar have a centre line radius of approximately the minimum permitted by the diameter of the tubing employed and all bends are separated by a length of straight tubing sufficient to produce a configuration that is symmetrical about the transverse centre line of the handlebar boss with an overall width of approximately sixteen inches and where the overall dimension on a line perpendicular to the line of the top tube in the plane of the bicycle frame is approximately twelve inches and the extension of the handlebar above and below the handlebar boss being approximately equidistant.

A brake lever of the invention to replace the brake levers of the brake operating assemblages designed for installation on the drop racing handlebar consisting of a single unit of cast or moulded or machined metal in the form of a bent two pronged fork with the space separation of the prongs (8) fixed by a solid metal stabilizer (6) and the handle (9) bent approximately 80 degrees to create an inside angle with the face of a prong of approximately one hundred degrees. The prong faces of the brake adaptor lever contain the shaft hole (11) approximately seven sixteenths inch in diameter to receive the standard pivotal lever shaft and standard nonmetallic bearings for installation in the standard brake lever assemblage mounting bracket (7) with both edges of each prong containing semicircular notched saddles (10) to receive the standard detached brake cable connection collar (12), salvaged from the displaced standard vertical brake lever, for the attachment of the brake cable (13) enabling the modified brake assemblage to be mounted on the inside face of the third straight portion (4) of the handlebar, projecting the assemblage toward the cyclist and locating the brake lever handle (9) parallel to the first straight portion (1) of the handlebar where both can be grasped simultaneously providing brake operation by a lift up action. The brake adaptor lever is made reversible by its symmetry about the horizontal plane passing through the centre lines of the faces of the prongs.

What is claimed is:

1. A combination bicycle touring handlebar and brake lever for mounting on a bicycle handlebar stem, said handlebar consisting of a boss with a first straight length of bar having portions equidistantly on each side of the boss, these first straight portions permitting the cyclist to assume a hands on semicrouched posture, each of the straight length portions terminating at first bent portions, said first bent portions projecting the bar upwardly above the level of the boss to connect to second straight portions, the bar further including a second set of bent portions for curving the bar forwardly and downwardly to third staight portions providing mounting means for brake lever assemblages, said second bent portions permitting the cyclist to assume a hands on upright posture, said third straight portions terminating below said boss at third bent portions, the bar terminating in fourth straight portions permitting the cyclist to assume a hands on crouched posture, said brake lever to replace the conventional brake lever of a brake operating assemblage installed on a conventional drop racing handlebar, forming a modified brake assemblage so as to be mounted on said touring handlebar in such a position as to provide for positive brake operation.

2. The combination bicycle touring handle bar and brake lever of claim 1 wherein the first bends of the handlebar are 90 degrees and terminate the first straight portions of the handlebar and extend the bar upwardly.

3. The combination bicycle touring handlebar and brake lever of claim 1 wherein the second bends of the handlebar are approximately 170 degrees and terminate the second straight portions of the handlebar and extend the bar forwardly and downwardly.

4. The combination bicycle touring handlebar and brake lever of claim 1 wherein the third bends of the handlebar are approximately 100 degrees and terminate the third straight portions of the handlebar and extend the bar rearwardly.

5. The combination bicycle touring handlebar and brake lever of claim 1 wherein all bends of the handlebar have a centre line radius of approximately the minimum permitted by the diameter of the tubing employed and where all bends are separated by a straight length of tubing sufficient to produce a configuration that is symmetrical about the transverse centre line of the handlebar boss with an overall width of approximately sixteen inches and with an overall height of approximately twelve inches, said handlebar extending approximately equidistantly above and below the level of the first straight portions of the handlebar.

6. The combination bicycle touring handlebar and brake lever of claim 1 wherein the brake lever consists of a unit of cast, moulded or machined metal in the form of a bent two pronged fork, the fork prongs are symmetrical so as to provide for reversibility.

7. The combination bicycle touring handlebar and brake lever of claim 1 wherein the brake lever consists of two prongs with a space separation of the prongs fixed by a solid metal stabilizer and a brake handle bent approximately 80 degrees to create an inside angle with the prong face of approximately 100 degrees, said prongs are provided with holes of approximately seven sixteenth inch diameter to receive a standard pivotal lever shaft and nonmetallic bearings for installation in a conventional brake assemblage bracket, said prongs are further provided with semicircular notched saddles to receive a detached standard brake cable connection collar obtainable from the displaced vertical main brake lever.

8. The combination bicycle touring handlebar and brake lever of claim 1 wherein the modified brake operating assemblage is mounted on the inside face of the third straight portion of the touring handlebar between the second and third bends projecting the brake assemblage back toward the cyclist where both the brake lever handle and the first straight portion of the handlebar can be grasped simultaneously for brake operation.

* * * * *